(12) United States Patent　　(10) Patent No.:　　US 9,026,593 B2
Park et al.　　　　　　　　　　　(45) Date of Patent:　　　May 5, 2015

(54) METHOD AND SYSTEM FOR PROVIDING EXTENDED SOCIAL NETWORK SERVICE

(75) Inventors: Kyu-In Park, Seoul (KR); Jong-Tae Park, Daegu (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 497 days.

(21) Appl. No.: 13/330,159

(22) Filed: Dec. 19, 2011

(65)　　　　　Prior Publication Data
US 2013/0046824 A1　　Feb. 21, 2013

(30)　　　Foreign Application Priority Data
Aug. 18, 2011　(KR) .................. 10-2011-0082382

(51) Int. Cl.
　　*G06F 15/16*　　(2006.01)
　　*G06Q 50/00*　　(2012.01)
　　*G06Q 10/10*　　(2012.01)
(52) U.S. Cl.
　　CPC .............. *G06Q 50/01* (2013.01); *G06Q 10/10* (2013.01)
(58) Field of Classification Search
　　CPC ...................................................... G06Q 50/01
　　USPC ................................................ 709/204, 225
　　See application file for complete search history.

(56)　　　　　　References Cited

U.S. PATENT DOCUMENTS

| | | | |
|---|---|---|---|
| 2011/0258556 A1* | 10/2011 | Kiciman et al. | 715/751 |
| 2011/0289153 A1* | 11/2011 | Hull et al. | 709/205 |
| 2011/0314516 A1* | 12/2011 | Li et al. | 726/3 |
| 2012/0102050 A1* | 4/2012 | Button et al. | 707/749 |
| 2013/0013682 A1* | 1/2013 | Juan et al. | 709/204 |
| 2013/0018823 A1* | 1/2013 | Masood | 706/12 |
| 2013/0031489 A1* | 1/2013 | Gubin et al. | 715/753 |
| 2013/0041893 A1* | 2/2013 | Strike | 707/723 |
| 2013/0046879 A1* | 2/2013 | Garcia et al. | 709/224 |

FOREIGN PATENT DOCUMENTS

| | | |
|---|---|---|
| KR | 10-2008-0101064 A | 11/2008 |
| KR | 1020080101062 A | 11/2008 |
| KR | 10-2011-0085831 A | 7/2011 |

OTHER PUBLICATIONS blog.naver.com/marketoryoso?Redirect=Log&logNo=113303703; Sep. 15, 2010.
Korean Office Action issued in application No. 10-2011-0082382 on Jan. 21, 2013.

* cited by examiner

*Primary Examiner* — Lynn Feild
*Assistant Examiner* — Jonathan Bui
(74) *Attorney, Agent, or Firm* — Mintz Levin Cohn Ferris Glovsky and Popeo, P.C.; Kongsik Kim

(57)　　　　　　ABSTRACT

Present invention provides a method and system for providing an extended social network service (SNS), the method and system enabling a user logged in an SNS to receive information in the form of newsfeed not only from users who have a friend relationship with the logged-in user in the SNS but also from users who have an acquaintance relationship with the logged-in user through the friend relationship. Present invention also provide a method and system for providing an extended SNS, the method and system adding information about a friend relationship-based connection path between a user logged in an SNS and each user who has an acquaintance relationship with the logged-in user to content shared between them, so that the reliability of the shared content can be determined.

5 Claims, 6 Drawing Sheets

METHOD AND SYSTEM FOR PROVIDING EXTENDED SOCIAL NETWORK SERVICE

CROSS-REFERENCE TO RELATED APPLICATION

This application claims priority from Korean Patent Application No. 10-2011-0082382 filed on Aug. 18, 2011 in the Korean Intellectual Property Office, the disclosure of which is incorporated herein by reference in its entirety.

BACKGROUND OF THE INVENTION

1. Field of the Invention

The present invention relates to a method and system for providing an extended social network service (SNS), and more particularly, to a method and system for providing an extended SNS, in which the scope of personal relationships for information sharing is not limited to a one-on-one friend relationship between users in an SNS but is extended based on the friend relationship.

2. Description of the Related Art

Conventional Web information search systems have problems providing information specific to a particular situation in real time and in a reliable manner. For example, Google™ of U.S and Naver™ of Korea, which are information search systems most widely used around the world, enable users to find necessary information on the Internet by providing most searched information or using other methods based on information stored on the Web. However, these information search systems cannot be used to share, in real time, information specific to a particular situation—such as information about today's lunch special in a local restaurant or an accident occurred during a company climbing competition—with related local acquaintances or company colleagues in a reliable manner.

Recently, various social network services (SNSs) based on social relations among people have been introduced. Most SNSs are used to share information based on social relations among people, such as family, school alumni, company colleagues, church members, and members of various communities.

SNS-based information sharing overcomes the above limitations of Web search and allows information specific to a particular situation to be shared among friends in a reliable manner. However, most of the conventional SNSs allow information to be shared among friends only. This may increase the reliability of shared information but limit the scope of information sharing only to friends.

In summary, Web information search and existing SNS-based information sharing methods and systems have many problems allowing information specific to a particular situation to be shared among socially related people effectively, widely, and reliably.

As a related art, Korean Patent Publication No. 2011-0002063 discloses a method of accessing reliable user-created content. In this related art, social relations are collected from a plurality of social network sites, and the collected social relations are combined to create user extended social networks for each user. That is, the related art requires collecting information from a plurality of social network sites. This may make it possible to collect reliable content but may not be desirable for extending a personal relationship in one social network site. In addition, collecting information from a plurality of social network sites incurs additional costs.

SUMMARY OF THE INVENTION

Aspects of the present invention provide a method and system for providing an extended social network service (SNS), the method and system enabling a user logged in an SNS to receive information in the form of newsfeed not only from users who have a friend relationship with the logged-in user in the SNS but also from users who have an acquaintance relationship with the logged-in user through the friend relationship.

Aspects of the present invention also provide a method and system for providing an extended SNS, the method and system providing various criteria for filtering users who have an acquaintance relationship with a user logged in an SNS to select users who will share information with the logged-in user.

Aspects of the present invention also provide a method of establishing a database of user information and personal relationship information, the method employed to provide an extended SNS in which the scope of information sharing is not limited to a friend relationship but is extended to an acquaintance relationship based on the friend relationship.

Aspects of the present invention also provide a method and system for providing an extended SNS, the method and system adding information about a friend relationship-based connection path between a user logged in an SNS and each user who has an acquaintance relationship with the logged-in user to content shared between them, so that the reliability of the shared content can be determined.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a method of providing an extended SNS. The method includes: designating at least some of users, who have an acquaintance relationship with a user logged in an SNS, as content providers for the logged-in user; and providing content, which is uploaded to the SNS by the content providers, to the logged-in user in the form of newsfeed, wherein one or more users connect two users, who have an acquaintance relationship, through friend relationships.

In order to prevent the number of acquaintances of the logged-in user from increasing unlimitedly, the number of users connecting the two users, who have the acquaintance relationship, through the friend relationships may be limited to a predetermined number or less.

The designating of at least some of the users who have the acquaintance relationship with the logged-in user as the content providers may include designating users, whose interests are in common with one or more of interests of the logged-in user, as the content providers; designating users, whose degree of trust with the logged-in user is equal to or greater than a predetermined value, as the content providers; designating users, who have the acquaintance relationship with the logged-in user through a specific user, as the content providers, wherein the specific user serves as a connector and is one of users who have a friend relationship with the logged-in user; designating users, who chose a specific area as a current location, as the content providers; or designating users, whose social distance from the logged-in user is equal to or less than a value set by the logged-in user, as the content providers.

The providing of the content, which is uploaded to the SNS by the content providers, to the logged-in user in the form of the newsfeed may include adding information about a connection path between the logged-in user and each of the content providers to content provided to the logged-in user in the form of a newsfeed.

According to another aspect of the present invention, there is provided a method of providing an extended SNS. The method includes: receiving acquaintance search conditions from a user logged in an SNS; and displaying a list of acquaintances who meet the acquaintance search conditions from among users who have an acquaintance relationship with the logged-in user, wherein one or more users connect two users, who have an acquaintance relationship, through friend relationships.

The displaying of the list of acquaintances may include displaying information about a connection path between the logged-in user and each acquaintance designated as a content provider. In addition, the receiving of the acquaintance search conditions may include receiving at least one of interest, the degree of trust, social distance, and current location as the acquaintance search conditions.

According to another aspect of the present invention, there is provided a method of establishing an extended SNS database. The method includes: receiving, from a first user logged in an SNS, a friend request addressed to a second user; receiving from the second user information about whether to accept the friend request; adding data on new acquaintances created by the addition of the second user as a friend to data on a list of acquaintances of the first user; and adding data on new acquaintances created by the addition of the first user as a friend to data on a list of acquaintances of the second user, wherein one or more users connect two users, who have an acquaintance relationship, through friend relationships.

The adding of the data on the new acquaintances created by the addition of the second user as the friend to the data on the list of acquaintances of the first user may include: calculating the degree of trust between the first user and each of the new acquaintances; and adding the data on the new acquaintances which includes the calculated degree of trust.

According to another aspect of the present invention, there is provided a system for providing an extended SNS. The system includes: an interaction target user designation unit designating at least some of users, who have an acquaintance relationship with a user logged in an SNS, as interaction target users of the logged-in user; and a user interface (UI) provision unit providing the SNS between the logged-in user and each of the interaction target users and displaying information about a connection path between the logged-in user and each of the interaction target users on a UI related to the SNS, wherein one or more users connect two users, who have an acquaintance relationship, through friend relationships.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

First of all, with reference to FIG. 1, relationships between users in an extended social network service (SNS) according to the present invention will be described, and terms used in the present specification will be defined.

Figure 1:
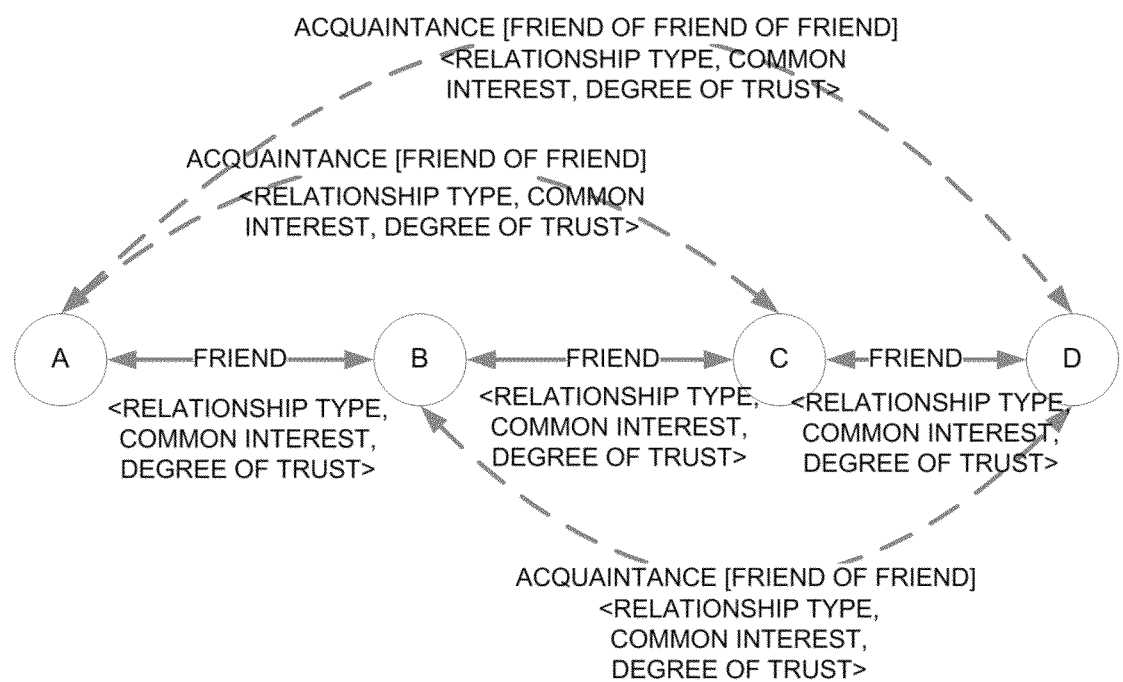
FIG. 1 is a conceptual diagram illustrating relationships between users in an extended social network service (SNS) according to the present invention.

In FIG. 1, relationships between four users A through D are illustrated. A 'friend' relationship indicated by a solid arrow is a relationship established by consent of users. The friend relationship may be established by mutual consent of both users. The friend relationship may also be established when a user accepts another user's friend request.

An 'acquaintance' relationship indicated by a dotted arrow is a relationship established by the extension of the friend relationship. Unlike the friend relationship, the acquaintance relationship is a relationship that can be established by the existence of the friend relationship, without requiring consent of users. Terms used in the present specification will be defined below.

Definition 1: In the present invention, a friend is indicated by F, and those having the friend relationship with the friend, that is, friends of the friend are indicated using an operator oF.

For example, a user's friend is indicated by F, a friend of a friend is indicated by FoF, a friend of the user's friend (a friend of F) is indicated by FoF, and a friend of the friend of the friend (a friend of FoF) is indicated by FoFoF.

Definition 2: A user's acquaintances, as used herein, are generally all people the user can know through an extended friend relationship. The user's friends are excluded from a list of acquaintances. That is, acquaintances generally refer to people the user can know by extending a chain of friend relationships involving the user's friend. The acquaintances are {FoF, FoFoF, FoFoFoF, ...} and are, in brief, indicated by F(oF)+.

Here, '+' is a repetition operator having an integer value. All friends and acquaintances having social relationships with the user are indicated by F(oF)*, where is a repetition operator having an integer value of 0, 1, 2, .... For example, a friend of the user's friend is indicated by FoF. In this case, the value of '+' in F(oF)+ is 1. In addition, a friend of a friend of a friend of the use's friend (a friend of FoFoF) is indicated by FoFoFoF. In this case, the value of '+' in F(oF)+ is 3.

Definition 3: A social connection path, as used herein, denotes a path that connects two users as acquaintances through friend relationships.

For example, a social connection path between user A and user C is A-B-C, and a social connection path between user A and user D is A-B-C-D.

Definition 4: A connector, as used herein, refers to a user's friend on a social connection path that connects the user and an acquaintance.

For example, in FIG. 1, a connector between user A and acquaintance D is user B.

Definition 5: A social distance, as used herein, is a value obtained by subtracting one from the number of users on a social connection path. A social distance of a shortest connection path from among social connection paths between users is referred to as a shortest social distance.

For example, in FIG. 1, a social distance between user A and user C is two.

The extended SNS according to the present invention is provided based on the above relationships between users.

The friend relationship is accompanied by its attributes as shown in FIG. 1. For example, relationship type (friend, family, company colleague, etc.), common interest (soccer, baseball, movie, book, etc.), and the degree of trust may accompany the friend relationship as attributes. The attributes of the friend relationship may be input by a user who requested the establishment of the friend relationship and may later be modified by one of two users who established the friend relationship with each other.

The extended SNS according to the present invention may add attributes (such as relationship type, common interest and the degree of trust) not only to the friend relationship but also to the acquaintance relationship. However, by the nature of the acquaintance relationship, the number of users directly involved in the acquaintance relationship may be large. Therefore, unlike attribute values of the friend relationship, attribute values of the acquaintance relationship may not be input by users directly involved in the acquaintance relationship. Instead, a system for providing the extended SNS may set the attribute values of the acquaintance relationship according to a pre-defined rule.

The attributes of the friend relationship may include attributes pre-defined in the extended SNS according to the present invention and new attribute values set by a user.

The extended SNS model according to the present invention has extensibility in two aspects, unlike a conventional SNS model. One aspect is that relationship attributes are not limited but are extensible. The other aspect is that, unlike in the conventional SNS model, the relationship attributes are not limited to the friend relationship but are defined also for the acquaintance relationship such as a friend of a friend, a friend of a friend of a friend, or a friend of a friend of a friend of a friend.

Most conventional SNSs have not given any particular weight nor any relationship attributes (such as the degree of trust) to the acquaintance relationship. However, in today's global village connected by the Internet, the relationships between people are not limited to conventional social relationships, such as school alumni, but tend to extend beyond the limits of regions based on interests. In particular, trust can be built even between users having the acquaintance relationship if they have a common interest. That is, the users having the acquaintance relationship can build trust, that is, a degree of trust in terms not of a personal relationship, but of information sharing.

In the present invention, the system automatically defines attributes (e.g., common interest and the degree of trust) of the acquaintance relationship. Thus, the present invention can provide a solution to the problem of an excessive increase in the number of users to interact with (hereinafter, referred to as "interaction target users") due to the extension of the scope of interaction target users to users having an acquaintance relationship with a logged-in user. For example, the scope of interaction target users may be limited to acquaintance users sharing a common interest with the logged-in user or acquaintance users whose degree of trust with the logged-in user is equal to or greater than a predetermined value.

A method of calculating the degree of trust between acquaintances according to an embodiment of the present invention will now be described.

Property 1: It is assumed that a social connection path between user $X_1$ and $X_n$ is $(X_1, X_2, X_3, \ldots, X_n)$ and that the degree of trust for each friend relationship has been determined. Then, the degree of trust $T(X_1, X_n)$ between users $X_1$ and $X_n$ who have an acquaintance relationship is given by $$T(X_1, X_n) = \frac{\sum_{k=1}^{n-1} \alpha_k T(X_k, X_{k+1})}{(n-1)^m}$$

where $\alpha_k$ is an impact factor indicating the degree of closeness between $X_k$ and $X_{k+1}$ and may be a predetermined real number pre-defined by the system. In addition, m is a weight given to a shortest social distance between acquaintances and may be a natural number. The value of m may be increased in order to increase the degree of trust as the degree of closeness between users increases.

Property 2: The degree of trust $(X_i, X_j)$ between two arbitrary users on a social connection path of $(X_1, X_2, X_3, \ldots, X_n)$ is given by $$T(X_i, X_j) = \frac{\sum_{k=i}^{j-1} \alpha_k T(X_k, X_{k+1})}{(j-i)^m}.$$

If a plurality of connection paths exist between a user and F(oF)+, a plurality of shortest connection paths between the user and F(oF)+ are selected. Then, from the selected shortest connection paths, a connection path with a highest degree of trust is determined to a trust path between the user and F(oF)+.

Next, a method of providing a newsfeed service in the extended SNS according to an embodiment of the present invention will be described with reference to FIGS. 2 through 4.

Figure 2:
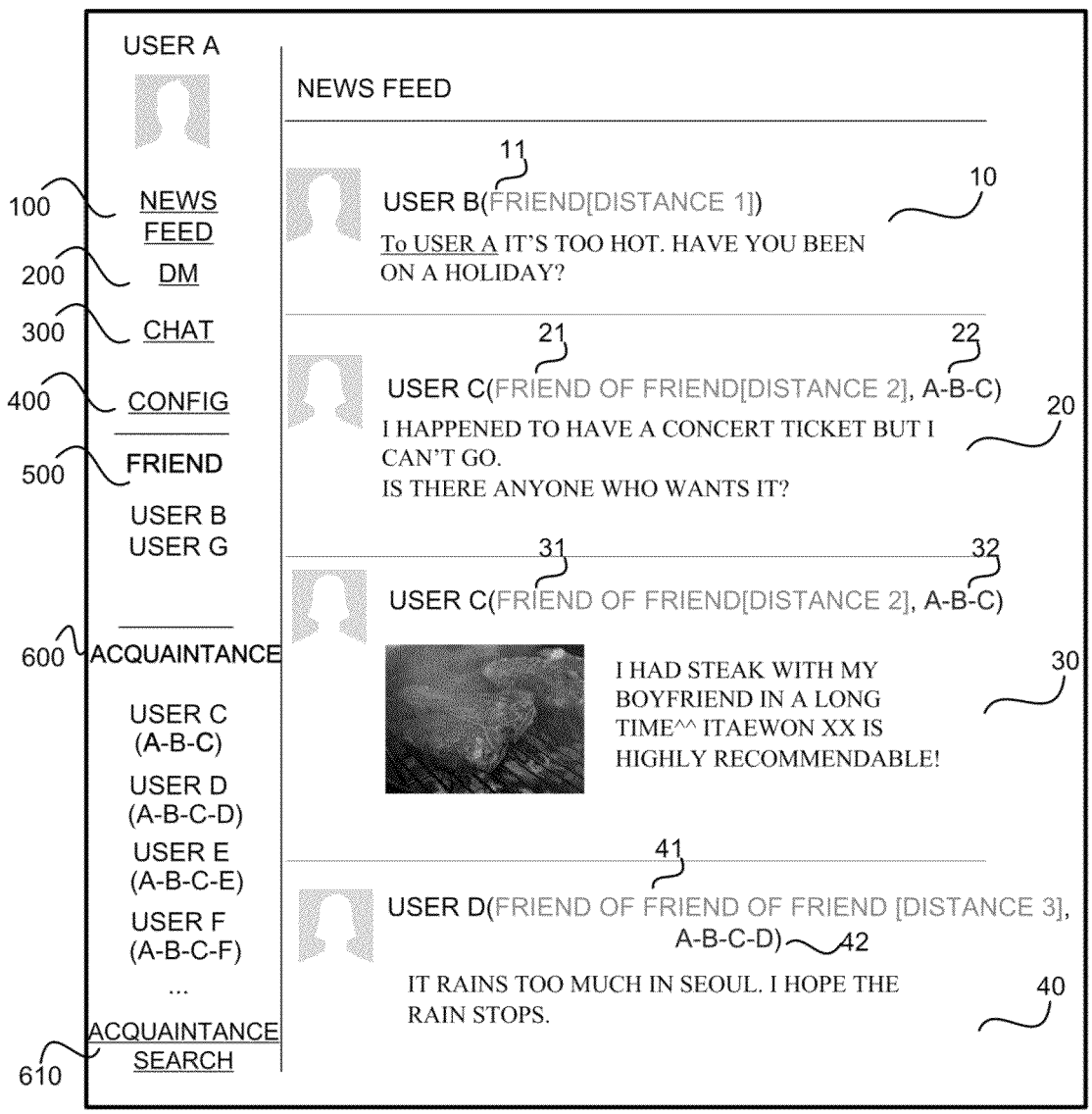
FIG. 2 shows a newsfeed service user interface (UI) in the extended SNS according to an embodiment of the present invention.

FIG. 2 shows a newsfeed service user interface (UI) according to the current embodiment. Referring to FIG. 2, user A is connected to the extended SNS. On the left side are a newsfeed link 100, a direct message (DM) link 200, a chat link 300, and an CONFIG link 400 for displaying newsfeed, direct message, chat, and CONFIG UIs provided by the extended SNS according to the current embodiment in a main area on the right side.

In addition, an area 500 that displays a list of friends of user A connected to the extended SNS and an area 600 that displays a list of acquaintances of user A may be provided on the left side of the newsfeed service UI. A social connection path between user A and each acquaintance displayed in the acquaintance list display area 600 may be provided next to each acquaintance's name. In addition, an acquaintance search link 610 for performing an acquaintance search function may be displayed in the acquaintance list display area 600.

A newsfeed service is a service for providing a link to uploaded content or the uploaded content itself in a page accessed by a user, so that the user can view the uploaded content without visiting a site to which the content was uploaded.

A newsfeed service of a conventional SNS provides a logged-in user with content, which is uploaded only by users having a friend relationship with the logged-in user, in the form of newsfeed. However, a newsfeed service according to the current embodiment provides a logged-in user with content, which is uploaded not only by users having a friend relationship with the logged-in user but also by users having an acquaintance relationship with the logged-in user, in the form of newsfeed.

Referring to FIG. 2, four newsfeed 10 through 40 are posted in a page accessed by user A. Only one newsfeed 10 has been posted by a friend of user A, that is, user B, and three newsfeed 20 through 40 have been posted by acquaintances of user A, that is, users C and D.

According to a method of providing a newsfeed service in a conventional SNS, user A has to establish a friend relationship directly with users C and D in order to receive newsfeed from users C and D. However, according to the present invention, since user B and user C have a friend relationship and user C and user D have a friend relationship, if user A and user B establish a friend relationship with each other, an acquaintance relationship is automatically established between users C and D. The friend relationship established between user A and user B enables user A to receive newsfeed from users C and D.

However, as the number of friend relationships increases, the number of acquaintance relationships may increase geometrically. Accordingly, users in the acquaintance relationships may become anonymous. In this case, the newsfeed service of user A becomes no better than a bulletin board. To prevent this situation and receive reliable information, the newsfeed service according to the current embodiment may add information about a connection path between a logged-in user (e.g., user A) and each content provider to content provided to the logged-in user in the form of a newsfeed or may limit the scope of content providers, who will provide newsfeed, to some of acquaintances of the logged-in user.

Adding information about a connection path between a logged-in user and each content provider to content provided to the logged-in user in the form of a newsfeed will now be described.

Referring to FIG. 2, social distance information 11, 21, 31 or 41 and social connection path information 22, 32 or 42 may be provided next to each user's name. The social distance information 11, 21, 31 and 41 may be provided in the form of 'friend,' 'friend of a friend,' . . . or in the form of 'distance 1' (meaning a social distance of 1 from user A), 'distance 2,' . . . .

Figure 3:
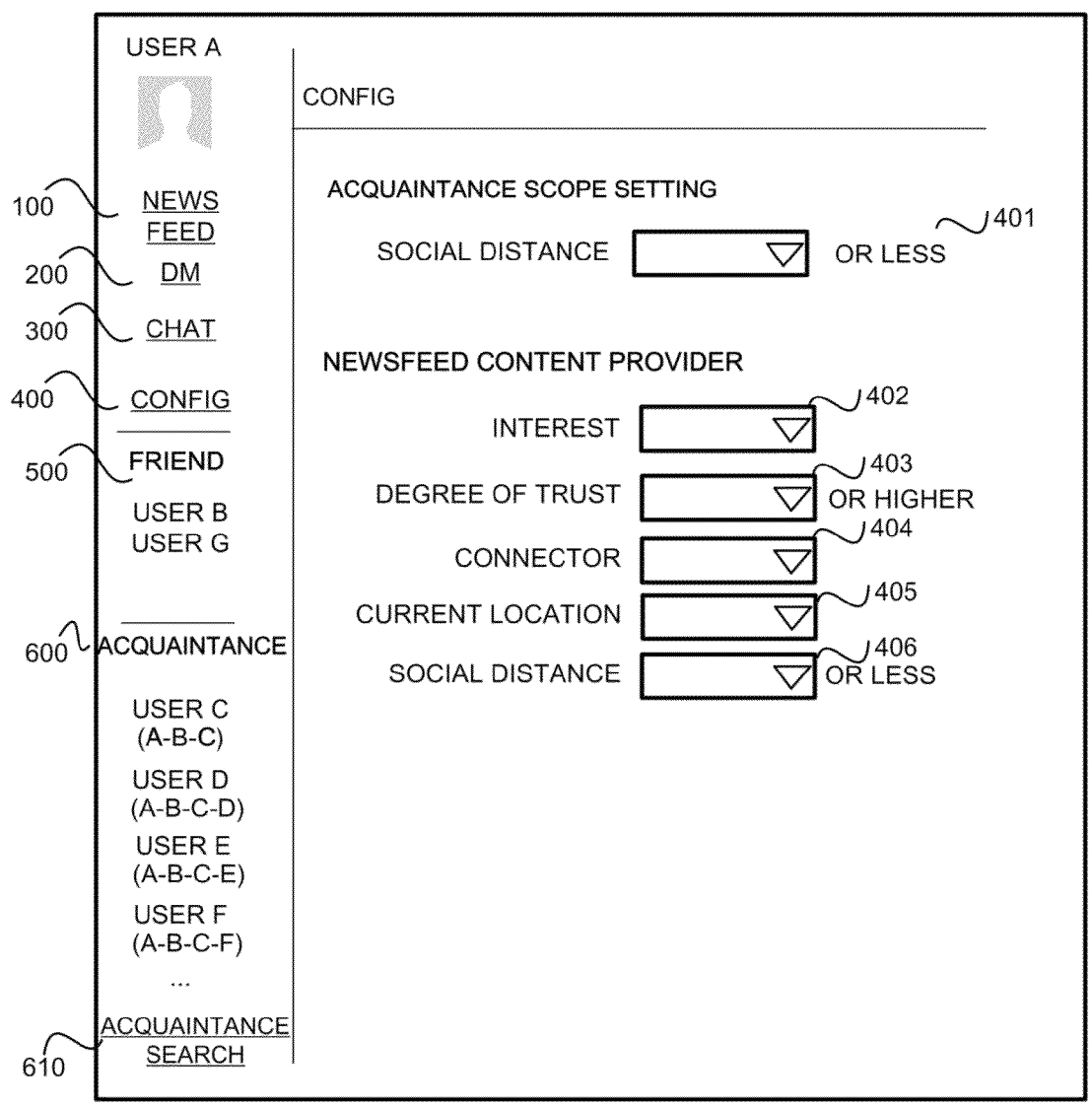
FIG. 3 shows a UI for setting the scope of acquaintances and the scope of newsfeed content providers according to an embodiment of the present invention.

FIG. 3 shows a UI displayed in an area on the right when the CONFIG link 400 is selected in an area on the left.

In this UI, the scope of acquaintances may be defined. To prevent the number of acquaintances from increasing excessively, it may be economical to limit the scope of acquaintances to within a predetermined social distance. The scope of acquaintances may be set by a user, but restrictions on the number of acquaintances may be imposed by the system to prevent an excessive increase in the number of acquaintances. In FIG. 3, an edit window 401 used to limit the scope of acquaintances is illustrated. For example, if the scope of acquaintances is set to a social distance of three or less, it is limited to within 'a friend of a friend of a friend.'

In this UI, the scope of newsfeed content providers may be defined. As described above, requirements for a newsfeed content provider may be set, and newsfeed may be received only from those who meet the requirements.

Referring to FIG. 3, requirements for a newsfeed content provider may be interest 402, degree of trust 403, connector 404, current location 405, and social distance 406 specified in a profile. Not all of the requirements need to be input, and the requirements may be combined by OR or AND.

The interest input window 402 contains items that user A input to his or her profile as interests, and user A may select one of them.

For example, when user A searches for acquaintances interested in soccer which is one of the interests of user A, acquaintances who entered soccer as their interest in their profiles may be found from among the acquaintances of user A. Here, the intention of user A may be to receive new news about the soccer industry or video content containing, e.g., amazing scoring plays, in the form of a newsfeed. However, it may better suit the intention of user A to include acquaintance in a list of newsfeed content providers, if every user connect the acquaintance and user A through friend relationships chose soccer as their interest, than to include all acquaintances who entered soccer as their interest in their profiles in the list of newsfeed content providers.

Therefore, acquaintances that chose soccer as their interest and every user connects user A and the acquaintances chose soccer as their interest, may be designated as news-feed content providers.

The degree of trust input window 403 may contain degrees or scopes of trust to choose from, and user A can select one of them. In the case of a friend relationship, the degree of trust may be input directly by a user when the friend relationship is established or may be input by the system according to a pre-defined rule (e.g., the frequency of mobile phone calls or the frequency of e-mail exchanges). In the case of an acquaintance relationship, a value calculated by the system using the equations defined in properties 1 and 2 may be input.

The connector input window 404 contains a list of friends of user A, and user A can select one of them.

The current location input window 405 contains locations that can be entered as a current location in a profile in the SNS according to the present invention, and user A can select one of them.

The social distance input window 406 contains distances within a social distance defined as the scope of acquaintance (for example, distances 2, 3 and 4 if the scope of acquaintances is set to within a social distance of 4), and user A can select one of them.

Figure 4:
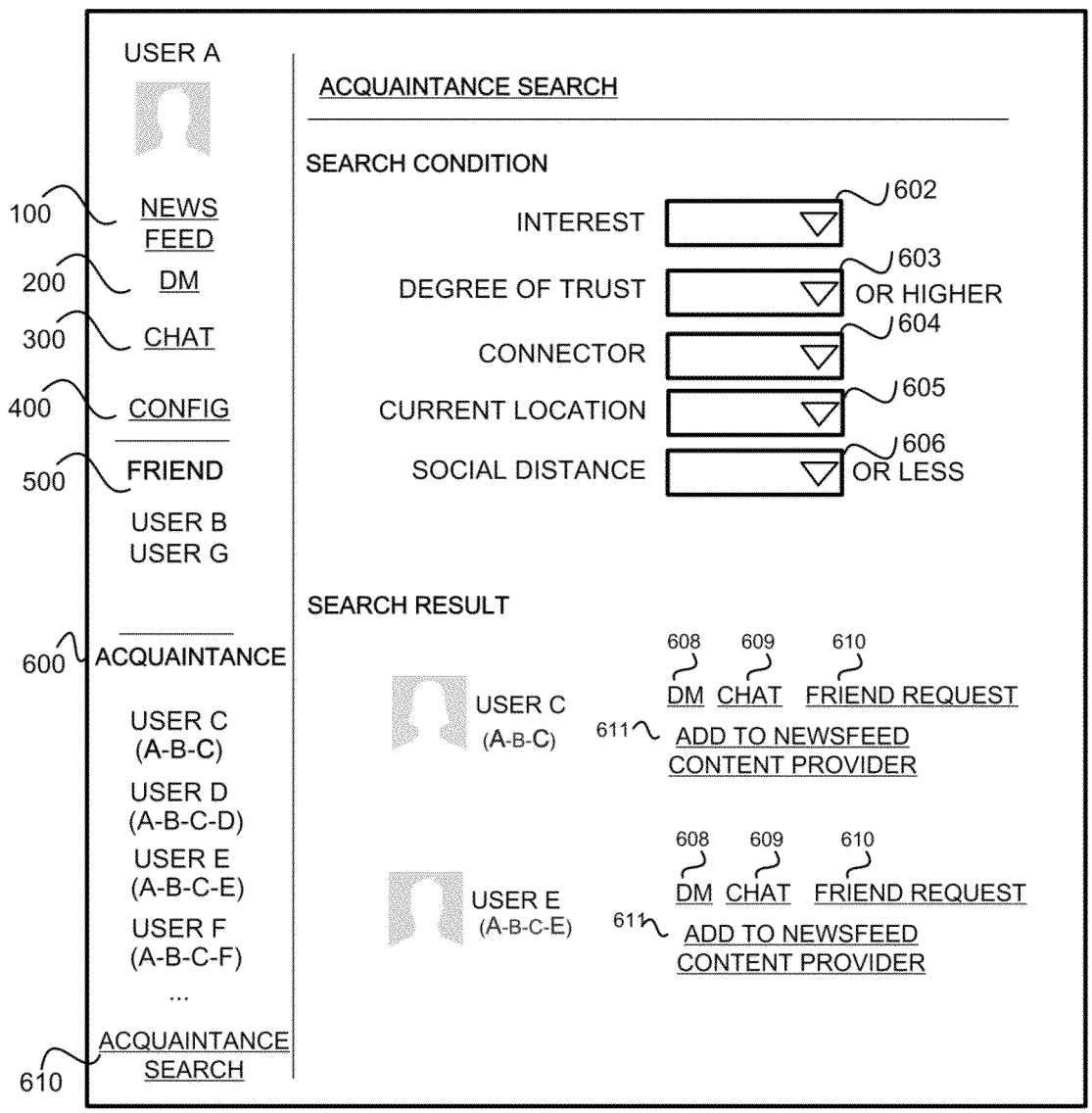
FIG. 4 shows an acquaintance search UI according to an embodiment of the present invention.

FIG. 4 shows a UI displayed in the right area when the acquaintance search link 610 is selected in the left area. Acquaintance search conditions may be interest 602, degree of trust 603, connector 604, current location 605, and social distance 606 specified in a profile, as shown in FIG. 3. The acquaintance search method implemented by inputting each search condition may be the same as the method of selecting newsfeed content providers in FIG. 3.

Using the acquaintance search function provided by the acquaintance search link 610 shown in FIG. 4, user A can find acquaintances who meet desired conditions from among all users who have an acquaintance relationship with user A. A social connection path between user A and each of the found acquaintances is provided next to the name of each of the found acquaintances, thereby helping user A to identify his or her connection to each of the found acquaintances.

The acquaintance search function according to the current embodiment may provide links to chat and direct message services next to the name of each of the found acquaintances as shown in FIG. 4, so that user A can develop his or her relationship with each of the found acquaintances.

In addition, referring to FIG. 4, user A can establish a friend relationship with any of the found acquaintances by making a friend request using a friend request link 610 or can add any of the found acquaintances to a list of newsfeed content providers using an "add to newsfeed content provider" link 611.

Figure 5:
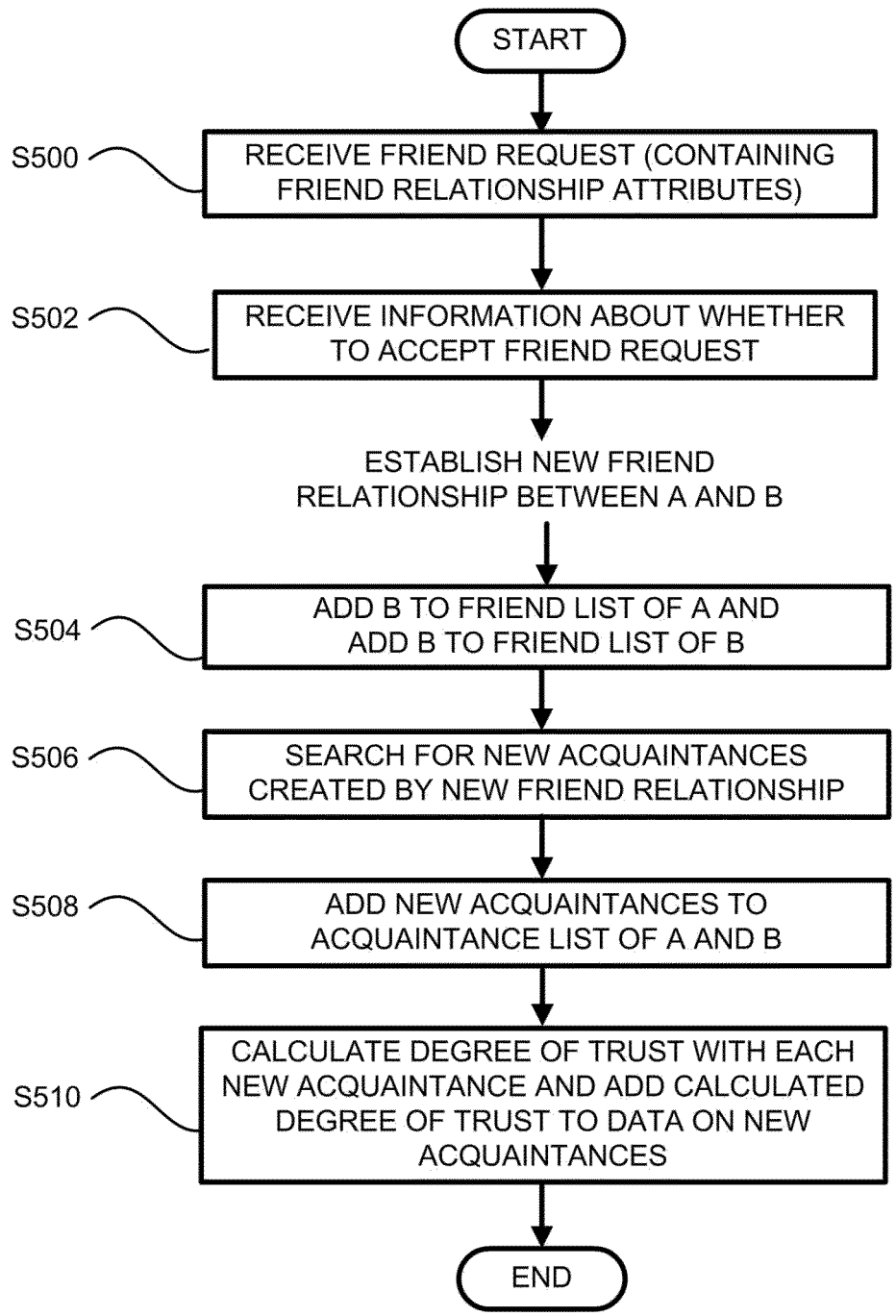
FIG. 5 is a flowchart illustrating a method of establishing an extended SNS database according to an embodiment of the present invention.

Hereinafter, a method of establishing an extended SNS database according to an embodiment of the present invention will be described with reference to FIG. 5.

An extended SNS according to the present invention provide an information sharing function among users by reflecting not only friend relationships but also acquaintance relationships. Accordingly, it requires a different database from a database of user information and information about relationships among users in a conventional SNS.

In the method of establishing an extended SNS database according to the current embodiment, a database of user information and information about relationships among users, which is required in an extended SNS, is established.

In the database establishment method according to the current embodiment, a friend request containing friend relationship attributes is received (operation S500). When a new friend relationship is established after a recipient of the friend request accepts the friend request (operation S502), both a user who made the friend request and a user who accepted the friend request add each other to their lists of friends.

Next, news acquaintances created by the establishment of the new friend relationship are searched for (operation S506). In searching for the new acquaintances (operation S506), the scope of acquaintances set in the CONFIG UI of FIG. 3 or the default scope of acquaintances of the system may be applied.

The found new acquaintances are added to both users' lists of acquaintances (operation S508). In addition, the degree of trust in each of the found acquaintances is calculated and added to data on the new acquaintances (operation S510). The degree of trust is calculated using the equations specified in properties 1 and 2.

In the method of establishing an extended SNS database according to the current embodiment, the list of acquaintances is updated at predetermined intervals to correct errors in acquaintance relationships caused by the addition/deletion of friend relationships.

In the method of establishing an extended SNS database according to the current embodiment, acquaintance relationships among users are managed as well as friend relationships among users, unlike in a method of establishing a conventional SNS database in which only friend relationships among users are managed.

Hereinafter, the configuration and operation of a system for providing an extended SNS service according to an embodiment of the present invention will be described with reference to FIG. 6.

Figure 6:
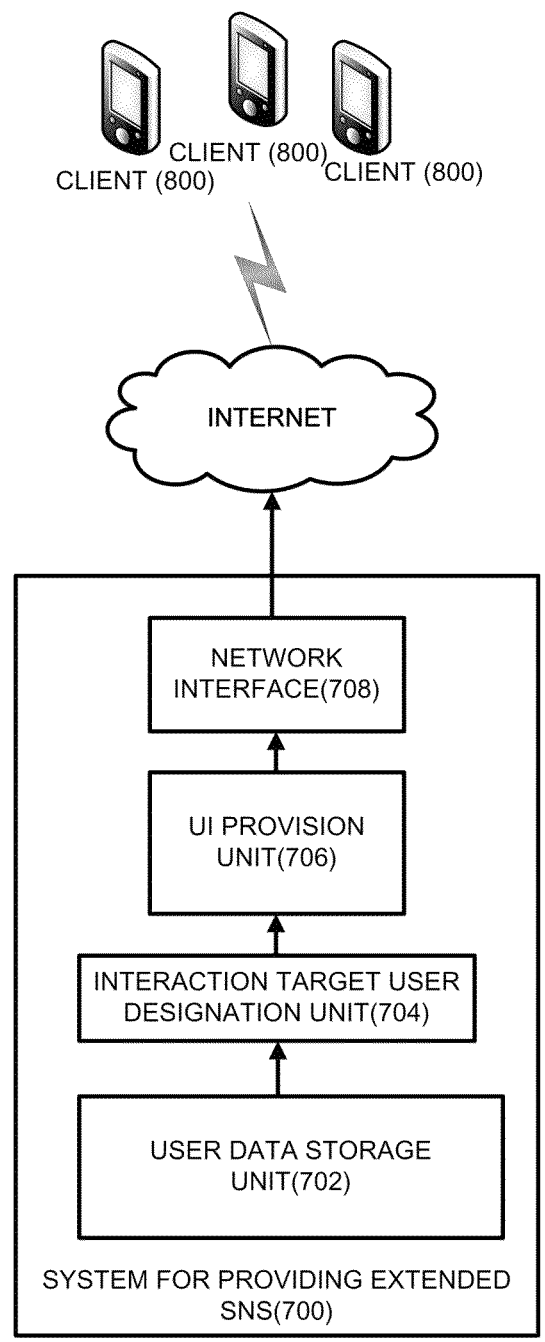
FIG. 6 is a block diagram of a system for providing an extended SNS according to an embodiment of the present invention.

FIG. 6 is a block diagram of a system for providing an extended SNS according to an embodiment of the present invention. Referring to FIG. 6, the system for providing an extended SNS according to the current embodiment may include a user data storage unit 702, an interaction target user designation unit 704, a UI provision unit 706, and a network interface 708.

The interaction target user designation unit 704 designates at least some of users who have an acquaintance relationship with a user logged in an SNS as interaction target users.

The UI provision unit 706 provides the SNS between the logged-in user and an interaction target user of the logged-in user. The UI provision unit 706 additionally displays information about a connection path between the logged-in user and the interaction target user on a UI related to the SNS. The SNS may include, for example, chat, direct message, and new feed services.

The SNS-related UI generated by the UI provision unit 706 may be provided to clients 800 through the network interface 708 over the Internet.

The user data storage unit 702 stores profile information and personal relationship information of each user of the SNS. The personal relationship information may include a list of friends in friend relationships, a list of acquaintances in acquaintance relationships, friend relationship attribute data which contains the type of each friend relationship, a common interest and the degree of trust, and acquaintance relationship attribute data which contains the degree of trust in each acquaintance relationship.

The system for providing an extended SNS according to the current embodiment may provide an SNS between a user logged in the SNS and acquaintances designated as interaction target users from among users who have an acquaintance relationship with the logged-in user. In addition, the system according to the current embodiment may additionally provide information about a connection path of friend relationships between each interaction target user and the logged-in user. This information about the connection path can be used as basic data to determine the reliability of provided content and induce each content uploader to upload reliable information.

According to the present invention, a user logged in an SNS can receive information in the form of newsfeed not only from users who have a friend relationship with the logged-in user in the SNS but also from users who have an acquaintance relationship with the logged-in user through the friend relationship.

In addition, the present invention provides various criteria for filtering the users who have the acquaintance relationship with the logged-in user to select users who will share information with the logged-in user. Accordingly, the logged-in user can receive information in the form of newsfeed only from acquaintance users who meet desired conditions.

Furthermore, a database of user information and personal relationship information can be established to provide an extended SNS in which the scope of information sharing is not limited to the friend relationship but is extended to the acquaintance relationship based on the friend relationship.

Information about a connection path of friend relationships between the logged-in user and each acquaintance is added to content that the logged-in user receives from each acquaintance. This information about the connection path can be used to determine the reliability of the received content and can induce each content uploader to upload only reliable information.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A method of providing a social network service (SNS), the method comprising:
designating at least some of users, who have an acquaintance relationship with a user logged in the SNS, as content providers for the logged-in user; and
providing a content in the form of a newsfeed, which is uploaded to the SNS by the content providers of the logged-in user, to the logged-in user,
wherein one or more users connect two users who have the acquaintance relationship, through friend relationships in the SNS,
wherein the designating of the at least some of the users who have the acquaintance relationship with the logged-in user as the content providers comprises designating users, whose degree of trust with the logged-in user is equal to or greater than a predetermined value, as the content providers from among the users who have the acquaintance relationship with the logged-in user, and
wherein the degree of trust is calculated by:

$$T(X_1, X_n) = \frac{\sum_{k=1}^{n-1} \alpha_k T(X_k, X_{k+1})}{(n-1)^m}$$

wherein $X_1$ is the logged-in user, $X_n$ is an acquaintance of $X_1$, $\alpha_k$ is an impact factor indicating the degree of closeness between $X_1$ and $X_{k+1}$, and m is a weight given to a shortest social distance between acquaintances.

2. The method of claim 1, wherein the designating of the at least some of the users who have the acquaintance relationship with the logged-in user as the content providers comprises designating users, who chose a specific area as a current location, as the content providers.

3. The method of claim 1, wherein the designating of the at least some of the users who have the acquaintance relationship with the logged-in user as the content providers comprises designating users, whose social distance from the logged-in user is equal to or less than a value set by the logged-in user, as the content providers.

4. The method of claim 1, wherein the providing of the content, which is uploaded to the SNS by the content providers, to the logged-in user in the form of the newsfeed comprises adding information about a connection path between the logged-in user and each of the content providers to content provided to the logged-in user in the form of a newsfeed.

5. A method of providing a social network service (SNS), the method comprising:
designating at least some of users, who have an acquaintance relationship with a user logged in the SNS, as content providers for the logged-in user; and
providing a content in the form of a newsfeed, which is uploaded to the SNS by the content providers of the logged-in user, to the logged-in user,
wherein one or more users connect two users who have the acquaintance relationship, through friend relationships in the SNS, and
wherein the designating of the at least some of the users who have the acquaintance relationship with the logged-in user as the content providers comprises designating users, who have the acquaintance relationship with the logged-in user through a specific user, as the content providers, wherein the specific user serves as a connector and is one of users who have a friend relationship with the logged-in user.

* * * * *